(12) United States Patent
Jaaskelainen et al.

(10) Patent No.: US 10,295,690 B2
(45) Date of Patent: May 21, 2019

(54) DISTRIBUTED SEISMIC SENSING FOR IN-WELL MONITORING

(71) Applicant: Halliburton Energy Services, Inc., Houston, TX (US)

(72) Inventors: Kari-Mikko Jaaskelainen, Katy, TX (US); Ian B. Mitchell, Radford, VA (US)

(73) Assignee: Halliburton Energy Services, Inc., Houston, TX (US)

( * ) Notice: Subject to any disclaimer, the term of this patent is extended or adjusted under 35 U.S.C. 154(b) by 256 days.

(21) Appl. No.: 14/912,088

(22) PCT Filed: Sep. 18, 2013

(86) PCT No.: PCT/US2013/060376
§ 371 (c)(1),
(2) Date: Feb. 13, 2016

(87) PCT Pub. No.: WO2015/041644
PCT Pub. Date: Mar. 26, 2015

(65) Prior Publication Data
US 2016/0202368 A1    Jul. 14, 2016

(51) Int. Cl.
*G01V 1/22*  (2006.01)
*G01V 1/40*  (2006.01)
*G01V 1/28*  (2006.01)

(52) U.S. Cl.
CPC ............ *G01V 1/40* (2013.01); *G01V 1/226* (2013.01); *G01V 1/284* (2013.01)

(58) Field of Classification Search
CPC ........... G01V 1/40; G01V 1/226; G01V 1/284
(Continued)

(56) References Cited

U.S. PATENT DOCUMENTS

| 5,285,424 A | 2/1994 | Meyer |
| 6,211,964 B1 | 4/2001 | Luscombe et al. |

(Continued)

FOREIGN PATENT DOCUMENTS

| WO | 2012/084997 A2 | 6/2012 | |
| WO | WO-2013090544 A1 * | 6/2013 | ............... G01V 1/40 |

OTHER PUBLICATIONS

International Preliminary Report on Patentability issued in related PCT Application No. PCT/US2013/060376 dated Mar. 31, 2016, 8 pages.

(Continued)

*Primary Examiner* — Daniel L Murphy
(74) *Attorney, Agent, or Firm* — John W. Wustenberg; Baker Botts L.L.P.

(57) ABSTRACT

A method and apparatus for seismic sensing is described. The apparatus includes an outer cable coupled to a formation and an outer fiber component proximate to the outer cable. When seismic P- and S-waves propagate from the formation to the outer cable, strain is placed on the outer fiber cable, which may be measured by a distributed acoustic sensing system coupled to the outer fiber cable. An inner cable positioned within the outer cable includes a corresponding inner fiber component. The innerduct between the outer and inner cables is filled with a gas or fluid which allows only P-waves to propagate to the inner cable. Those P-waves induce strain on the inner fiber component, which may be measured by the distributed acoustic sensing system. By measuring the seismic P- and S-waves at the outer fiber component, and the isolated seismic P-wave at the inner fiber component, it is possible to calculate an isolated seismic S-wave measurement. Methods for deploying the seismic sensing apparatus are also described.

7 Claims, 2 Drawing Sheets

(58) Field of Classification Search
USPC .......................................................... 367/25
See application file for complete search history.

(56) References Cited

U.S. PATENT DOCUMENTS

| | | | |
|---|---|---|---|
| 7,315,666 B2 | 1/2008 | Van Der Spek | |
| 7,840,105 B2 | 11/2010 | Goldner et al. | |
| 9,091,589 B2* | 7/2015 | Den Boer | G02B 6/4415 |
| 2006/0182398 A1 | 8/2006 | Dowd et al. | |
| 2006/0202685 A1* | 9/2006 | Barolak | E21B 47/082 |
| | | | 324/221 |
| 2011/0280103 A1 | 11/2011 | Bostick, III | |
| 2012/0111560 A1 | 5/2012 | Hill et al. | |
| 2012/0222487 A1 | 9/2012 | Hill et al. | |

OTHER PUBLICATIONS

International Search Report and Written Opinion issued in related PCT Application No. PCT/US2013/060376 dated Jun. 3, 2014, 12 pages.

* cited by examiner

DISTRIBUTED SEISMIC SENSING FOR IN-WELL MONITORING

CROSS-REFERENCE TO RELATED APPLICATION

The present application is a U.S. National Stage Application of International Application No. PCT/US2013/060376 filed Sep. 18, 2013, which is incorporated herein by reference in its entirety for all purposes.

BACKGROUND

The present disclosure relates generally to oil field exploration and, more particularly, to a system and method for seismic sensing.

The use of seismic sensing tools is well known in the subterranean well drilling and completion art. Such tools measure acoustic P- and/or S-waves, which may exist as ambient geological vibration, may result from localized sources such as thumper trucks, or may be generated from larger scale phenomena such as earthquakes or explosions. Seismic sensing tools have included, for example, hydrophones, towed arrays with acoustic sensors, and fiber-optic sensing cables with single-point sensors. While such approaches typically are capable of measuring acoustic waves, they may only do so at discrete, localized points within the well—for example, the location of an individual hydrophone. Further, an individual tool may generally measure only standalone S-waves or the combination of P- and S-waves. Distributed measurements within a well comprising P- and S-waves may be possible by using multiple of the tools, for example a plurality of hydrophones, but this is time-consuming and expensive. Additionally, coupling the tools to the formation and well bore for ongoing monitoring presents a significant challenge.

FIGURES

Some specific exemplary embodiments of the disclosure may be understood by referring, in part, to the following description and the accompanying drawings.

Figure 1:
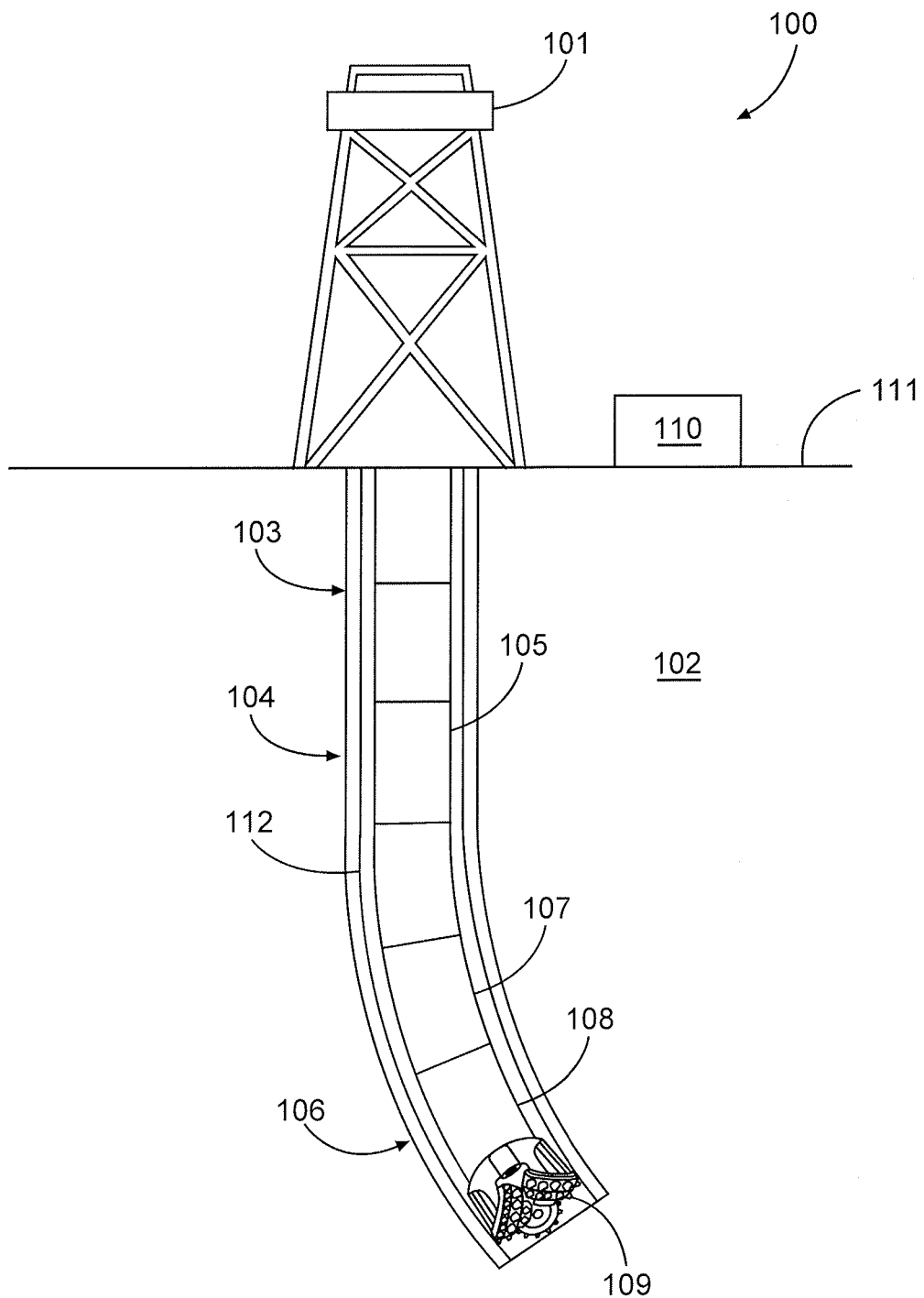

FIG. 1 illustrates an example drilling system.

Figure 2A:
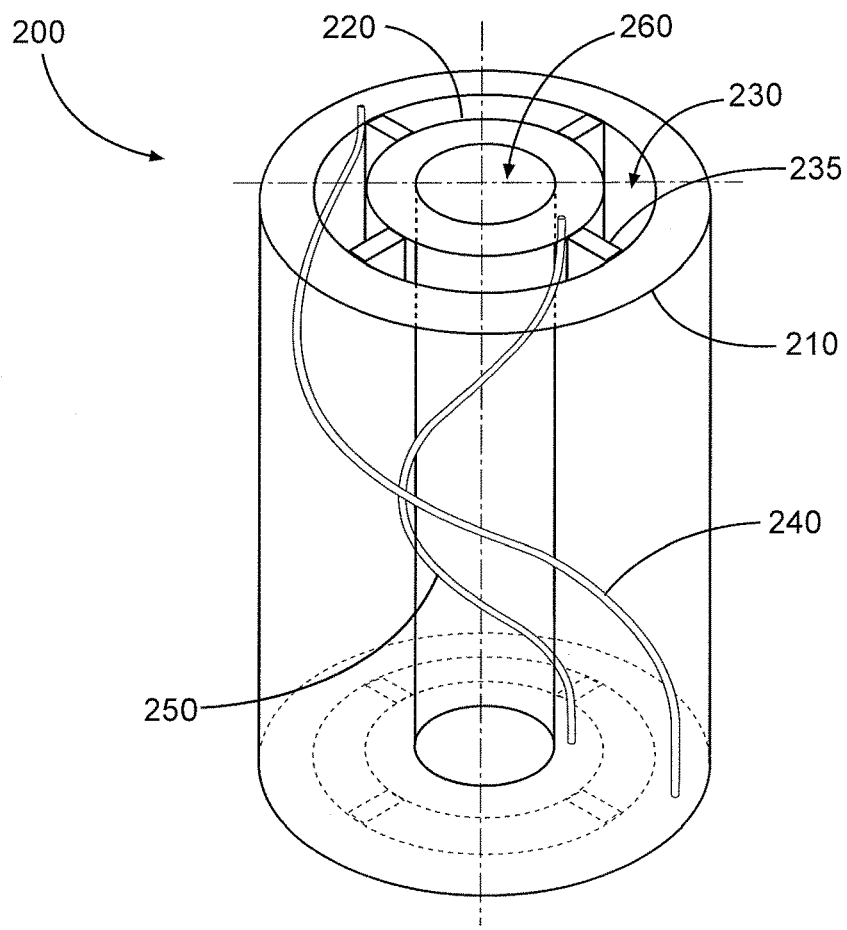
Figure 2B:
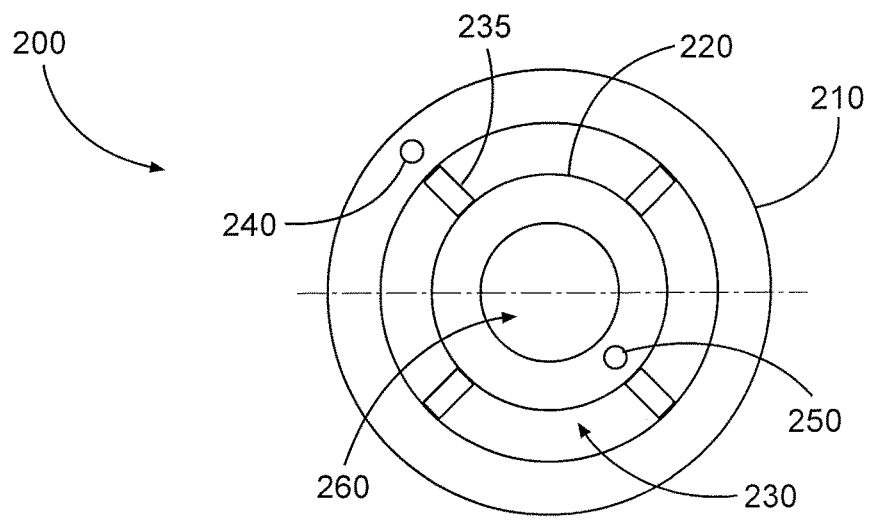

FIGS. 2A-B illustrate an embodiment of a seismic sensing system.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to oil field exploration and, more particularly, to a system and method for seismic sensing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Devices and methods in accordance with embodiments described herein may be used in one or more of measurement-while-drilling ("MWD") and logging-while-drilling ("LWD") operations. Embodiments described below with respect to one implementation are not intended to be limiting.

FIG. 1 is a diagram illustrating an example drilling system 100, according to aspects of the present disclosure. The drilling system 100 includes rig 101 at the surface 111 and positioned above borehole 103 within a subterranean formation 102. A well casing or liner 112 may be set within borehole 103. Rig 101 may be coupled to a drilling assembly 104, comprising drill string 105 and bottom hole assembly 106. The bottom hole assembly 106 may comprise a drill bit 109, steering assembly 108, and a LWD/MWD apparatus 107. A control unit 110 at the surface may comprise a processor and memory device, and may communicate with elements of the bottom hole assembly 106, including LWD/MWD apparatus 107 and steering assembly 108. The control unit 110 may receive data from and send control signals to the bottom hole assembly 106. Additionally, at least one processor and memory device may be located downhole within the bottom hole assembly 106 for the same purposes.

FIGS. 2A-B shows an embodiment of a distributed seismic sensing system 200; FIG. 2A presents an overview, while FIG. 2B shows a cross-section. As shown in FIGS. 2A-B, seismic sensing system 200 may comprise an outer cable 210 and an inner cable 220. The annulus between inner cable 220 and outer cable 210 is shown as innerduct 230. The open space within inner cable 220 is shown as hollow core 260. Although the dimensions of seismic system 200 may vary, in certain embodiments the system may be relatively small. For example, in one embodiment, the diameter of outer cable 210 may be approximately 2.4 inches, the diameter of inner cable 220 may be 1.9 inches, and the diameter of hollow core 260 may be 1.6 inches.

An outer fiber component 240 may be disposed proximate to outer cable 210. In the embodiment of FIGS. 2A-B, outer fiber component 240 is shown embedded in outer cable 210 and wrapped helically around it. As one of skill in the art would appreciate in light of the present disclosure, outer fiber component 240 may instead be positioned on the outside or inside edge of outer cable 210 or, alternatively, embedded inside of outer cable 210.

An inner fiber component 250 may be disposed proximate to inner cable 250. In the embodiment of FIGS. 2A-B, for example, inner fiber component 250 is shown embedded inside inner cable 220 and wrapped helically around it. Similar to outer fiber component 240, persons of ordinary skill in the art in light of the present disclosure will appreciate that alternative configurations of inner fiber component 250 are possible.

In one embodiment of the present invention, outer cable 210 may be coupled to a wellbore formation, such as the subterranean formation 102 shown in FIG. 1. In this way, outer cable 210 may experience seismic waves propagating through the formation. Such seismic waves may be the result of a variety of seismic events, including passive seismic events that produce background seismic noise and active seismic events, such as the use of thumper trucks to intentionally generate seismic waves. As one of skill in the art will appreciate, seismic waves include both primary waves ("P-waves") that are compressional or longitudinal in nature and secondary waves ("S-waves") that are shear or transverse in nature. P-waves travel through any type of material, including fluids; in air, P-waves take the form of sound waves. S-waves, by comparison, travel only through solids—liquids and gasses do not support shear stress. Thus, because outer cable 210 may be coupled directly to a formation, it may experience both the P- and S-waves propagating through the formation.

By comparison, in certain embodiments of the present invention, the innerduct 230 may be filled with a liquid or, alternatively, a gas. The liquid or gas may be selected to minimize the S-wave transference from outer cable 210 to inner cable 220, while still allowing P-waves to pass through and reach the inner cable 220. In this way, inner cable 220 may experience mostly or only seismic P-waves.

To facilitate the separation of inner cable 220 from outer cable 210 such that inner cable 220 experiences only seismic P-waves, centralizing components 235 may be used in innerduct 230. As one of skill in the art in light of the present disclosure will appreciate, numerous different centralizing components 235 may be used. In the embodiment of FIG. 2B, for example, soft gel type centralizers are shown between outer cable 210 and inner cable 220. Such soft gel sensors may allow some propagation of seismic S-waves from outer cable 210 to inner cable 220 but may be designed to minimize such propagation. Alternatively, in certain embodiments, outer cable 210 or inner cable 220 may comprise a jacket extruded over a strength member designed to provide structural support and rigidity. In embodiments where the strength member is metallic, magnetic centralization may be achieved by affixing magnets to inner cable 220.

The seismic waves experienced by outer cable 210 and inner cable 220 may cause strain and displacement on outer fiber component 240 and inner fiber component 250, respectively. Outer fiber component 240 and inner fiber component 250 may both be connected to a distributed acoustic sensing ("DAS") system. As those of skill in the art will appreciate, DAS systems may be used to measure strain on optical fiber cables using, for example, Rayleigh scattering. Thus, when seismic P- and S-waves experienced by outer cable 210 cause strain and displacement on outer fiber component 240, a DAS system interrogating outer fiber component 240 may be used to measure the seismic P- and S-waves. Similarly, when the P-waves experienced by inner cable 220 cause strain and displacement on inner fiber component 250, a DAS system interrogating inner fiber component 250 may be used to measure the P-wave. In this way, the outer fiber component 240 may be used to measure the combined effect of seismic P- and S-waves, while the inner fiber component 250 may be used to measure a mostly or completely isolated seismic P-wave. By using post-processing analysis on the information from both measurements, one of skill in the art will appreciate that a measurement of the isolated seismic S-wave may also be obtained.

Optionally, in order to compensate for the reduced seismic wave reaching inner fiber component 250 relative to outer fiber component 240, inner fiber component 250 may be configured to be more sensitive to strain and displacement measurements than outer fiber component 240. Further, in the embodiment shown in FIGS. 2A-B, only a single outer fiber component 240 and inner fiber component 250 are shown, but in alternative embodiments, two or more inner fiber components or outer fiber components may be used.

Additional fiber optic sensing technologies known to those of skill in the art may be used with outer fiber component 240 or inner fiber component 250. For example, Raman scattering, Brillouin scattering, or fiber Bragg grating may be used in order to measure properties including, for example, wavelength shift, phase shift, and intensity changes. Thus, using techniques known to those of skill in the art, the system may be configured to sense, for example, temperature, strain, or information concerning the condition of the fiber components.

The seismic sensing system 200 may be deployed in a variety of different locations and using a variety of different methods according to the present disclosure. For example, the seismic sensing system may be deployed in a borehole, such as borehole 103, in the annulus between a subterranean formation, such as subterranean formation 102, and borehole casing, such as borehole casing 112. Alternatively, the system may be deployed into an observation well or buried horizontally to measure surface seismic activity. In embodiments where the seismic sensing system 200 is buried at the surface, a person of ordinary skill in the art will appreciate that the shallow-depth overburden (approximately 200 meters) typically contains non-homogenous, complex structures that make resolution of signal paths difficult. The present invention, by enabling separate measurement of P- and S-waves, may advantageously enable easier characterization of the received seismic signals at those depths.

In certain embodiments, the seismic sensing system 200 may be constructed outside of the borehole and later deployed at the location to be monitored. For example, in embodiments where the seismic sensing system 200 will be deployed between a well casing and a subterranean formation, the system may be substantially constructed outside the borehole and then may be lowered into the annulus between the well casing and the subterranean formation. Optionally, a sinker bar may affixed to the bottom of seismic sensing system 200 in order to provide a downward force during the lowering operation, facilitating an even and straight deployment. In embodiments where outer fiber component 240 is disposed on the exterior of outer cable 210, centralizing components or bumper bars may be used to prevent damage to the fiber component 240 during the lowering procedure.

Once lowered into the annulus between the casing and the formation, the seismic sensing system may be secured to the formation to ensure a good coupling for transmission of seismic waves. In certain embodiments, this may be achieved by filling some or all of the hollow core 260 with a solid, such as cement or epoxy, and then using a plunger or plug to force the solid out of the bottom of the seismic sensing system 200 and into the annulus between the seismic sensing system 200 and the formation. The solid may be selected to provide optimal mechanical coupling between the seismic sensing system 200 and the formation, or it may contain fillers to optimize acoustic impedance and thereby provide maximum received signal strength. Optionally, a liquid may be used to force the plunger or plug down into hollow core 260. If used, the liquid may provide structural support to the seismic sensing system 200 to prevent collapse while the solid cures. The liquid may be removed after the solid has cured or left within hollow core 260. In certain embodiments, the hollow core 260 may be filled with foam.

In alternative embodiments, the seismic sensing system 200 may only be partially constructed prior to deployment. For example, the outer cable 210 and outer fiber component 240 may be deployed into a well using the cementing and plunging technique described above. After the outer cable 210 has been secured to the formation, the inner cable 220 and inner fiber component 250 may be introduced into the outer cable 210. Once the inner cable 220 and inner fiber component 250 are in place, the innerduct 230 may be filled with a liquid or gas selected to minimize the S-wave transference from outer cable 210 to inner cable 220.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces. Additionally, the terms "couple", "coupled", or "coupling" include direct or indirect coupling through intermediary structures or devices.

What is claimed is:

1. A seismic sensing system, comprising:
    an outer cable mechanically coupled to a formation, wherein the outer cable experiences one or more seismic waves propagating through the formation;
    an outer fiber component embedded in an exterior of the outer cable, wherein the outer fiber component is coupled to a distributed acoustic sensing system, and wherein a centralizing component is disposed exterior to the outer cable;
    a solid between the seismic sensing system and the formation, wherein the solid provides mechanical coupling between the seismic sensing system and the formation, and wherein the solid comprises fillers to optimize acoustic impedance;
    an inner cable disposed within the outer cable;
    an inner fiber component proximate to the inner cable, wherein the inner fiber component is coupled to the distributed acoustic sensing system, and wherein the inner fiber component is more sensitive to strain and displacement measurements than the outer fiber component;
    an innerduct between the outer cable and the inner cable, wherein the innerduct comprises one of a liquid or a gas that minimizes transference of one or more seismic S-waves of the one or more seismic waves from the outer cable to the inner cable while allowing transference of one or more seismic P-waves of the one or more seismic waves;
    a plurality of centralizers disposed in the innerduct between the outer cable and the inner cable, wherein the plurality of centralizers allow propagation of the one or more seismic P-waves to the inner cable while minimizing propagation of the one or more seismic S-waves to the inner cable, wherein the inner fiber measures the one or more seismic P-waves; and
    wherein the inner fiber component measures the one or more seismic P-waves when the one or more seismic P-waves experienced by the inner cable cause strain and displacement on the inner fiber component; and
    wherein the outer fiber component measures a combined effect of the one or more seismic P-waves and the one or more seismic S-waves, when the one or more seismic P-waves and the one or more seismic S-waves experienced by the outer cable cause strain and displacement on the outer fiber component.

2. The seismic sensing system of claim 1, wherein the innerduct is filled with a gas.

3. The seismic sensing system of claim 1, wherein the innerduct is filled with a liquid.

4. The seismic sensing system of claim 1, wherein the outer cable includes a strength member.

5. The seismic sensing system of claim 4, further comprising one or more magnets affixed to the inner cable.

6. The seismic sensing system of claim 1, wherein the plurality of centralizers are soft gel centralizers.

7. The seismic sensing system of claim 1, wherein the outer fiber component is wrapped helically around the outer cable.

* * * * *